US012759440B2

(12) United States Patent
McMullen

(10) Patent No.: US 12,759,440 B2
(45) Date of Patent: Oct. 13, 2026

(54) CHILD SAFETY SEAT STABILIZING DEVICE AND METHOD OF USE

(71) Applicant: Richard David McMullen, Clinton, PA (US)

(72) Inventor: Richard David McMullen, Clinton, PA (US)

( * ) Notice: Subject to any disclaimer, the term of this patent is extended or adjusted under 35 U.S.C. 154(b) by 198 days.

(21) Appl. No.: 18/734,026

(22) Filed: Jun. 5, 2024

(65) Prior Publication Data

US 2025/0001914 A1 Jan. 2, 2025

Related U.S. Application Data

(60) Provisional application No. 63/523,522, filed on Jun. 27, 2023.

(51) Int. Cl.
*B60N 2/28* (2006.01)

(52) U.S. Cl.
CPC ......... *B60N 2/2824* (2013.01); *B60N 2/2806* (2013.01)

(58) Field of Classification Search
CPC ............................ B60N 2/2806; B60N 2/2824
See application file for complete search history.

(56) References Cited

U.S. PATENT DOCUMENTS

| | | | | |
|---|---|---|---|---|
| 4,681,368 A * | 7/1987 | Heath | B60N 2/2821 297/256.16 X |
| 4,799,736 A | 1/1989 | Kassal | |
| 6,042,181 A * | 3/2000 | Goor | B60N 2/2845 297/256.16 |
| 7,097,245 B2 | 8/2006 | Barker | |
| 7,988,230 B2 * | 8/2011 | Heisey | B60N 2/2806 297/256.16 |
| 8,317,265 B2 | 11/2012 | Hutchinson | |
| 10,011,198 B2 | 7/2018 | Theander | |
| 10,427,559 B2 | 10/2019 | Anderson | |
| 2022/0048413 A1 | 2/2022 | Strong | |

FOREIGN PATENT DOCUMENTS

| | | | |
|---|---|---|---|
| AU | 2006200268 | 8/2006 | |
| GB | 2270834 A * | 3/1994 | B60N 2/2806 |
| GB | 2465267 | 5/2010 | |

* cited by examiner

*Primary Examiner* — Rodney B White

(57) ABSTRACT

A child safety seat stabilizing device enabling a child safety seat (CSS) to be installed in a cargo area of a vehicle includes a shell, which is rigid. Opposed sides of the shell are substantially triangular. A rear facet of the shell has a first angle that is complementary to a second angle defined by a rear surface of a passenger seat and a cargo bed of the vehicle. A front facet of the shell has a third angle that is complementary to a fourth angle defined by bottom and rear faces of the CSS. The shell is positionable between the passenger seat and the CSS to stabilize the CSS so that it can be securely fastened, using one or more straps, to anchors that are integral to the vehicle. The child safety device enables use of the CSS to transport a child in the cargo area.

13 Claims, 7 Drawing Sheets

CHILD SAFETY SEAT STABILIZING DEVICE AND METHOD OF USE

CROSS-REFERENCE TO RELATED APPLICATIONS

I hereby claim the benefit under 35 U.S.C. Section 119(e) of U.S. Provisional application 63/523,522 filed Jun. 27, 2023.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to child safety devices and more particularly pertains to a new child safety device enabling a child safety seat to be installed in a cargo area of a vehicle.

(2) Description of Related Art Including Information Disclosed Under 37 CFR 1.97 and 1.98

The prior art relates to child safety devices, which comprises child safety seats that are attachable to passenger seats of vehicles. The prior art does not disclose devices or methods which allow for child safety seats to be attached in a cargo area of a vehicle.

BRIEF SUMMARY OF THE INVENTION

An embodiment of the disclosure meets the needs presented above by generally comprising a shell, which defines an interior space and which is rigid. The shell has opposed sides, which are substantially triangular, and a rear facet and a front facet, which are substantially trapezoidal. The rear facet and a lower edge of each opposed side form a first angle, which is substantially complementary to a second angle that is defined by a rear surface of a passenger seat and a cargo bed of a vehicle. The front facet and the lower edge of each opposed side form a third angle, which is substantially complementary to a fourth angle that is defined by a bottom face and a rear face of a child safety seat. The shell is configured to be positioned between the passenger seat of the vehicle and the child safety seat to stabilize the child safety seat so that it can be securely fastened, using one or more straps, to anchors that are integral to the vehicle. The child safety device enables use of the child safety seat to transport a child in a cargo area of the vehicle.

Another embodiment of the disclosure includes a method of mounting a child safety seat in a cargo area of a vehicle. Steps of the method include positioning the rear facet of the shell against the rear surface of the passenger seat, positioning the rear face of the child safety seat against the front facet of the shell, and fastening the child safety seat, using one or more straps, to the anchors so that the child safety seat and the shell are fixedly positioned relative to the passenger seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
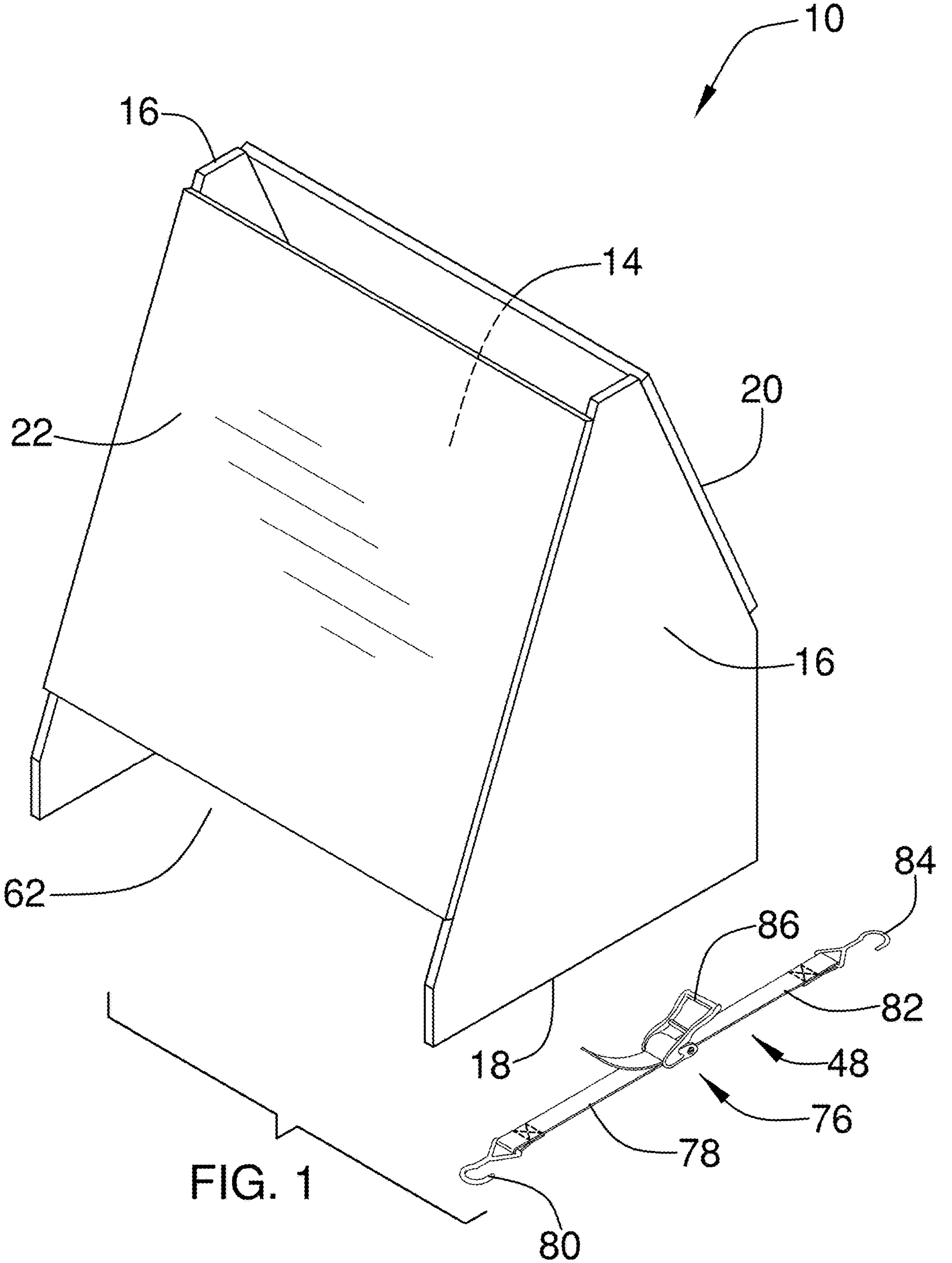
FIG. 1 is a front isometric perspective view of a child safety seat stabilizing device according to an embodiment of the disclosure.

With reference now to the drawings, and in particular to FIGS. 1 through 7 thereof, a new child safety device embodying the principles and concepts of an embodiment of the disclosure and generally designated by the reference numeral 10 will be described.

Figure 2:
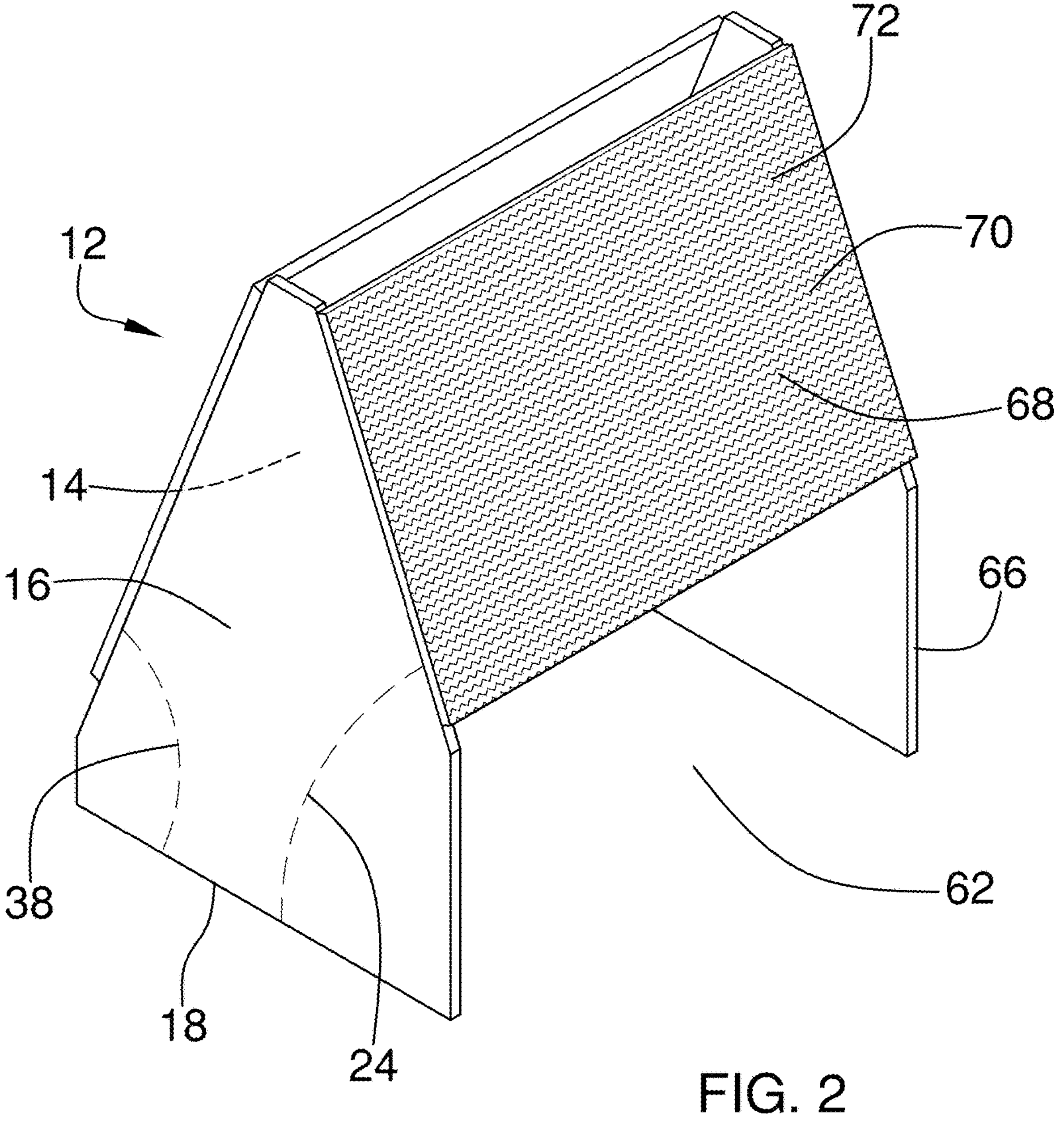
FIG. 2 is a rear isometric perspective view of an embodiment of the disclosure.
Figure 3:
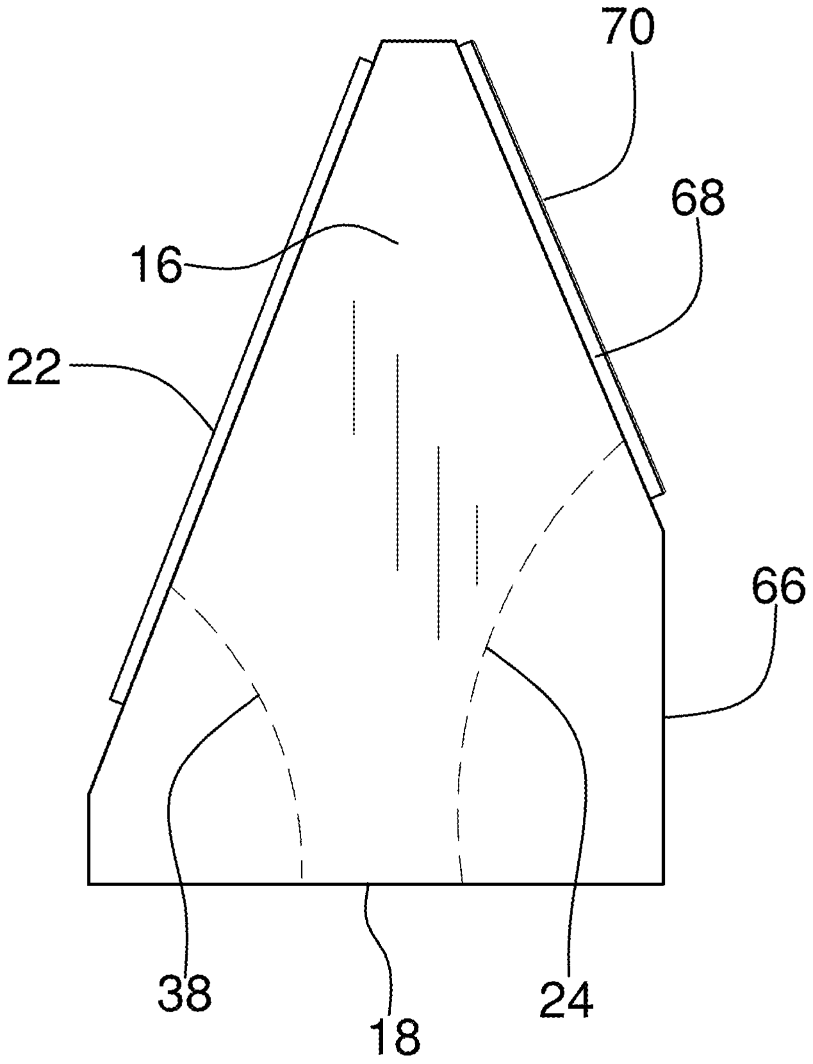
FIG. 3 is a side view of an embodiment of the disclosure.
Figure 4:
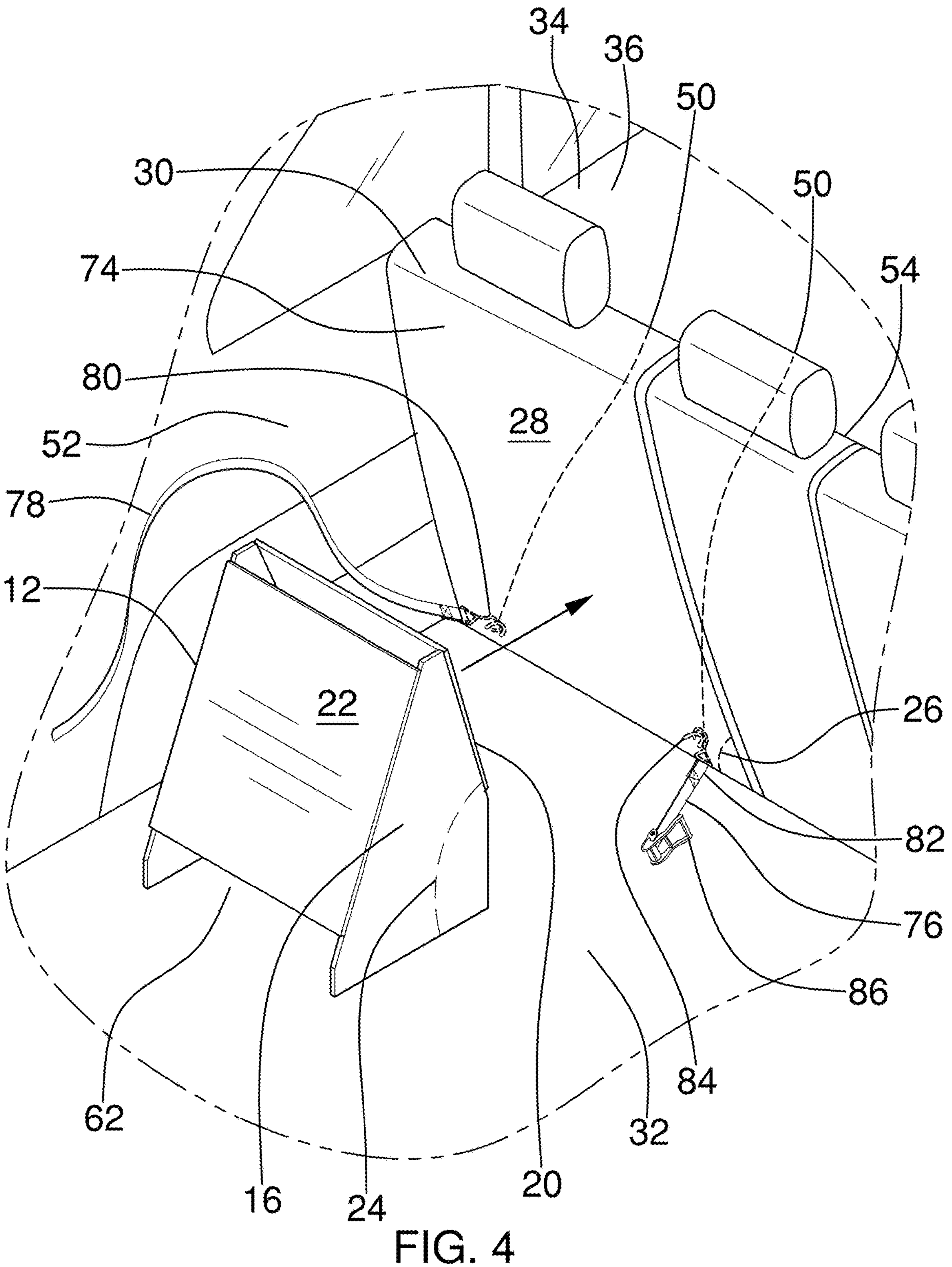
FIG. 4 is an in-use view of an embodiment of the disclosure.

As best illustrated in FIGS. 1 through 7, the child safety seat stabilizing device 10 generally comprises a shell 12, which defines an interior space 14 and which is rigid. While the interior space 14 may be empty, the present invention also anticipates the interior space 14 being substantially occupied by foamed elastomer or a material of which the shell 12 is comprised, such as, but not limited to, plastic, metal, wood, or the like. The shell 12 has opposed sides 16, which are substantially triangular, and a rear facet 20 and a front facet 22, which are substantially trapezoidal. As is shown in FIGS. 1 and 2, the rear facet 20 and the front facet 22 are substantially rectangular. The rear facet 20 and a lower edge 18 of each opposed side 16 form a first angle 24, which is substantially complementary to a second angle 26 that is defined by a rear surface 28 of a passenger seat 30 and a cargo bed 32 of a vehicle 34, such as, but not limited to, a Sport Utility Vehicle (SUV) 36.

The front facet 22 and the lower edge 18 of each opposed side 16 form a third angle 38, which is substantially complementary to a fourth angle 40 that is defined by a bottom face 42 and a rear face 44 of a child safety seat 46. The shell 12 is configured to be positioned between the passenger seat 30 of the vehicle 34 and the child safety seat 46 to stabilize the child safety seat 46 so that it can be securely fastened, using one or more straps 48, to anchors 50 that are integral to the vehicle 34. The child safety seat stabilizing device 10 enables use of the child safety seat 46 to transport a child in a cargo area 52 of the vehicle 34, thereby freeing up the passenger seat 30 for a passenger.

Figure 5:
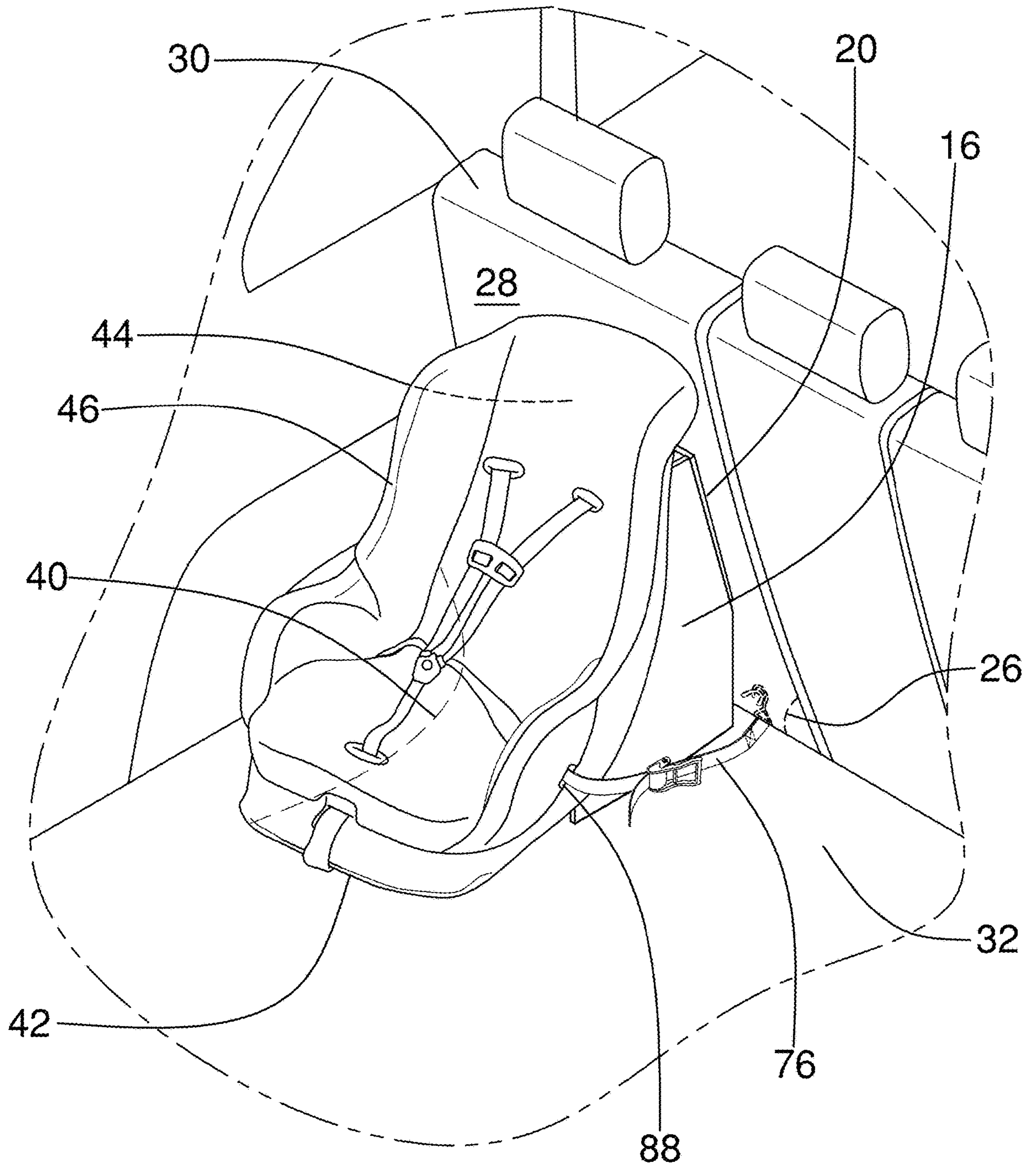
FIG. 5 is an in-use view of an embodiment of the disclosure.

SUVs 36 typically are fitted with a bench seat 54, as is shown in FIG. 5, which allows for seating of three passengers, or with a pair of rear bucket seats (not shown). For optimal safety of a child who is to be transported in an SUV 36 equipped with a bench seat 54, a child safety seat 46 would be centered on and mounted to the bench seat 54. While two additional passengers still could be accommodated on the bench seat 54, teenagers or adults would be cramped and uncomfortable. In the event two child safety seats 46 are required to be installed on the bench seat 54, the center position is rendered unusable for a teenager or adult. With an SUV 36 equipped with rear bucket seats, mounting a child safety seat 46 to one of the rear bucket seats eliminates seating for a passenger.

Figure 6:
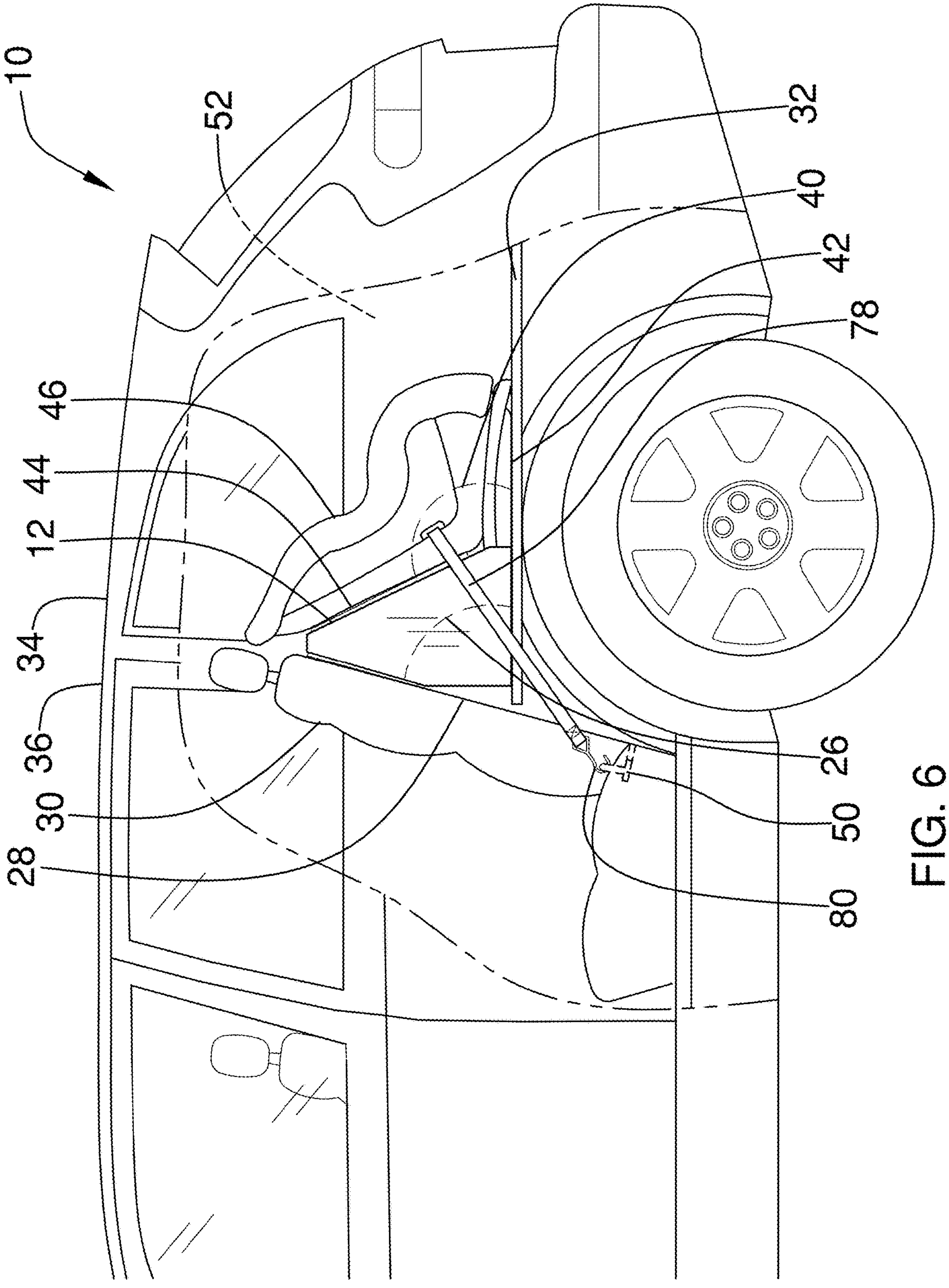
FIG. 6 is an in-use view of an embodiment of the disclosure.
Figure 7:
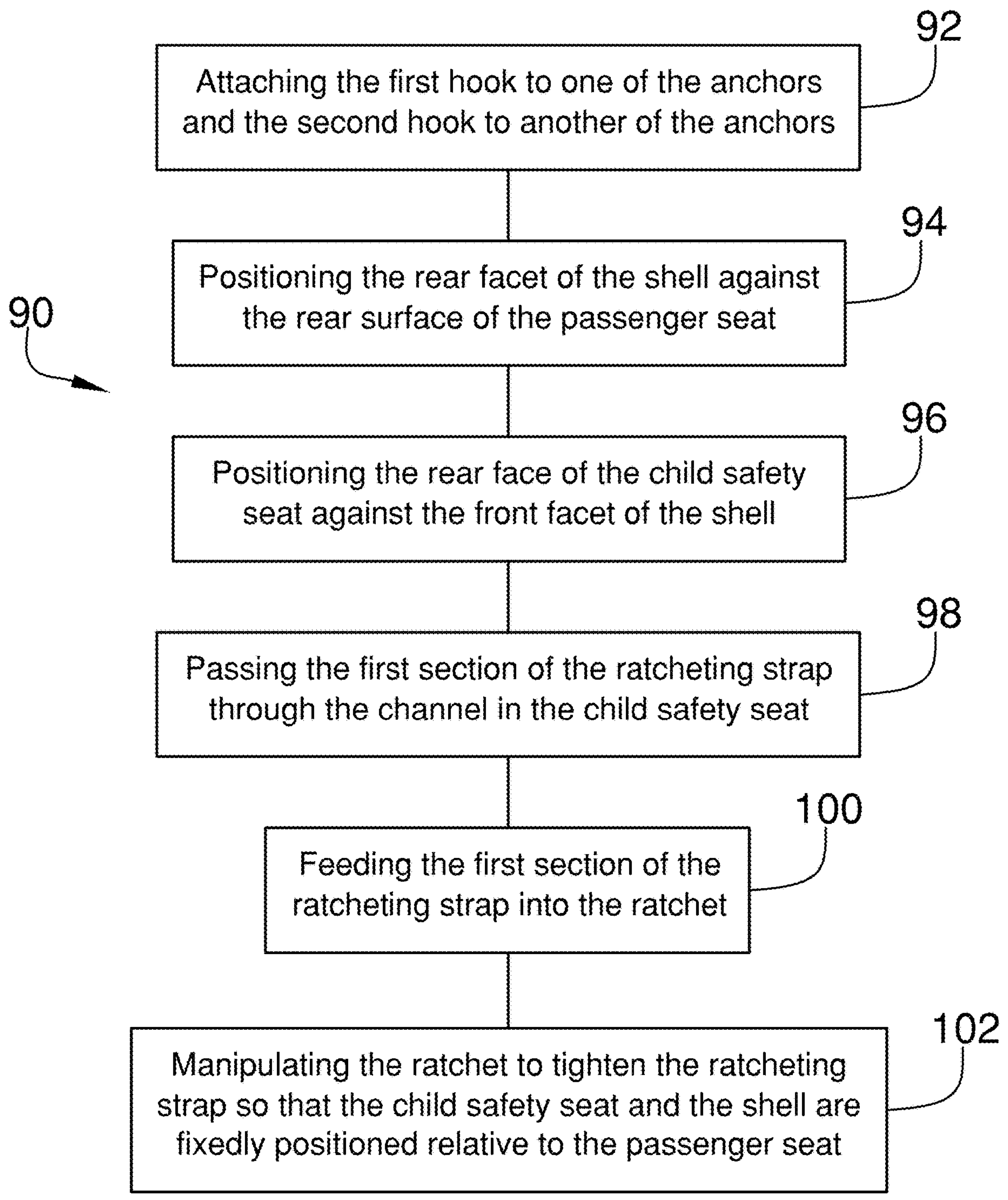
FIG. 7 is a flow diagram for a method utilizing an embodiment of the disclosure.

As is shown in FIG. 5, the opposed sides 16 are dimensionally taller than the front facet 22, thus defining 60 a bottom opening 62 in the shell 12. The bottom opening 62 facilitates access to the one or more straps 48 used in fastening the child safety seat 46 to the anchors 50. The shell 12 also may have a void 64 extending into the rear facet 20 and the opposed sides 16. The void 64 defines a vertical section 66 and an angular section 68 of the rear facet 20. Upon positioning of the angular section 68 against the rear surface 28 of the passenger seat 30, a space exists between the vertical section 66 and the passenger seat 30, as is shown in FIG. 6. The space also facilitates access to the one or more straps 48 used in fastening the child safety seat 46 to the anchors 50.

A connector 70 may be attached to the rear facet 20 of the shell 12 and configured to removably attach the shell 12 to the rear surface 28 of the passenger seat 30. The connector 70 is configured to limit movement of the shell 12 relative to the passenger seat 30 during attachment of the child safety seat 46 to the anchors 50. Limiting movement of the shell 12 during attachment of the one or more straps 48 assists a user in properly mounting the child safety seat 46. As is shown in FIG. 2, the connector 70 comprises a hook element 72 of a hook and loop fastener. The hook element 72 is configured to reversibly attach to a loop element (not shown) of a hook and loop fastener, which may be attached to the rear surface 28 of the passenger seat 30. The hook element 72 also is configured to reversibly attach to loop carpeting 74 that is attached, typically during manufacturing of the vehicle 34, to the rear surface 28 of the passenger seat 30. The present invention also anticipates the connector 70 comprising other connecting means, such as, but not limited to, pressure sensitive adhesives, latches, or the like.

Child safety seats 46 typically are supplied with strapping which allows for their attachment to the anchors 50, but this strapping may not be of sufficient length to allow the child safety seat 46 to be mounted within the cargo area 52 of a vehicle 34 using the child safety seat stabilizing device 10. The child safety seat stabilizing device 10 also may include the one or more straps 48, which may comprise a ratcheting strap 76, as is depicted in FIGS. 1 and 4-6. Such ratcheting straps 76 are well known in the art of straps and comprise a first section 78 fitted with a first hook 80 and a second section 82 fitted with a second hook 84 and a ratchet 86. The ratcheting strap 76 would be of sufficient length to allow for its use in mounting a variety of child safety seats 46 to a variety of passenger seats 30. The first hook 80 would be attached to one anchor 50 and the first section 78 passed through a channel 88 in the child safety seat 46. The second hook 84 would be attached to another anchor 50. The first section 78 then would be fed into the ratchet 86 and the ratchet 86 manipulated to tighten the ratcheting strap 76.

In use, the child safety seat stabilizing device 10 enables a method of mounting a child safety seat in a cargo area of a vehicle 90. The method 90 comprises providing the child safety seat stabilizing device 10, inclusive of the ratcheting strap 76. A first step 92 of the method 90 is attaching the first hook 80 to one of the anchors 50 and the second hook 84 to another of the anchors 50. A second step 94 of the method 90 is positioning the rear facet 20 of the shell 12 against the rear surface 28 of the passenger seat 30. A third step 96 of the method 90 is positioning the rear face 44 of the child safety seat 46 against the front facet 22 of the shell 12. A fourth step 98 of the method 90 is passing the first section 78 through the channel 88 in the child safety seat 46. A fifth step 100 of the method 90 is feeding the first section 78 into the ratchet 86. A sixth step 102 of the method 90 is manipulating the ratchet 86 to tighten the ratcheting strap 76 so that the child safety seat 46 and the shell 12 are fixedly positioned relative to the passenger seat 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A child safety seat stabilizing assembly comprising:

a shell defining an interior space, the shell being rigid, the shell having opposed sides, a rear facet, and a front facet, the opposed sides being substantially triangular, the rear facet and the front facet being substantially trapezoidal, the rear facet and a lower edge of each opposed side forming a first angle, the first angle being substantially complementary to a second angle defined by a rear surface of a passenger seat and a cargo bed of a vehicle, the front facet and the lower edge of each opposed side forming a third angle, the third angle being substantially complementary to a fourth angle defined by a bottom face and a rear surface of a child safety seat, wherein the shell is configured to be positioned between the passenger seat of the vehicle and the child safety seat to stabilize the child safety seat such that the child safety seat can be securely fastened, using one or more straps, to anchors integral to the vehicle, thereby enabling use of the child safety seat to transport a child in a cargo area of the vehicle; and wherein the opposed sides extend past the front facet defining a pair of side rails and a front recess positioned between the side rails of the pair of side rails, such that the child safety seat is partially nestable within the front recess, wherein the pair of side rails is configured to deter lateral movement of the child safety seat.

2. The child safety seat stabilizing device according to claim 1, wherein the base, the rear facet, and the front facet are each substantially rectangular shaped.

3. The child safety seat stabilizing device according to claim 1, wherein the opposed sides extend past the base defining a pair of bottom rails and a bottom recess, the bottom recess facilitating access to the one or more straps used in fastening the child safety seat to the anchors.

4. The child safety seat stabilizing device according to claim 1, further including a connector attached to the rear facet of the shell and being configured to removably attach the shell to the rear surface of the passenger seat, wherein the connector is configured to limit movement of the shell relative to the passenger seat during attachment of the child safety seat to the anchors.

5. The child safety seat stabilizing device according to claim 4, wherein the opposed sides extend past the base defining a pair of bottom rails and a bottom recess, the bottom recess facilitating access to the one or more straps used in fastening the child safety seat to the anchors.

6. A child safety seat stabilizing assembly comprising:

a shell defining an interior space, the shell being rigid, the shell having opposed sides, a rear facet, and a front facet, the opposed sides being substantially triangular, the rear facet and the front facet being substantially trapezoidal, the rear facet and a lower edge of each opposed side forming a first angle, the first angle being substantially complementary to a second angle defined by a rear surface of a passenger seat and a cargo bed of a vehicle, the front facet and the lower edge of each opposed side forming a third angle, the third angle being substantially complementary to a fourth angle defined by a bottom face and a rear surface of a child safety seat, wherein the shell is configured to be positioned between the passenger seat of the vehicle and the child safety seat to stabilize the child safety seat such that the child safety seat can be securely fastened, using one or more straps, to anchors integral to the vehicle, thereby enabling use of the child safety seat to transport a child in a cargo area of the vehicle; and wherein the opposed sides extend past the base defining a pair of bottom rails and a bottom recess, the bottom recess facilitating access to the one or more straps used in fastening the child safety seat to the anchors.

7. A child safety seat stabilizing assembly comprising:

a shell defining an interior space, the shell being rigid, the shell having opposed sides, a rear facet, and a front facet, the opposed sides being substantially triangular, the rear facet and the front facet being substantially trapezoidal, the rear facet and a lower edge of each opposed side forming a first angle, the first angle being substantially complementary to a second angle defined by a rear surface of a passenger seat and a cargo bed of a vehicle, the front facet and the lower edge of each opposed side forming a third angle, the third angle being substantially complementary to a fourth angle defined by a bottom face and a rear surface of a child safety seat, wherein the shell is configured to be positioned between the passenger seat of the vehicle and the child safety seat to stabilize the child safety seat such that the child safety seat can be securely fastened, using one or more straps, to anchors integral to the vehicle, thereby enabling use of the child safety seat to transport a child in a cargo area of the vehicle; and wherein the shell has a void extending into said rear facet and said base, the void defining a vertical section and an angular section of the rear facet, such that a space exists between the vertical section and the rear surface of the passenger seat of the vehicle upon positioning of the angular section against the rear surface of the passenger seat, the space facilitating access to the one or more straps used in fastening the child safety seat to the anchors.

8. A child safety seat stabilizing assembly comprising:

a shell defining an interior space, the shell being rigid, the shell having opposed sides, a rear facet, and a front facet, the opposed sides being substantially triangular, the rear facet and the front facet being substantially trapezoidal, the rear facet and a lower edge of each opposed side forming a first angle, the first angle being substantially complementary to a second angle defined by a rear surface of a passenger seat and a cargo bed of a vehicle, the front facet and the lower edge of each opposed side forming a third angle, the third angle being substantially complementary to a fourth angle defined by a bottom face and a rear surface of a child safety seat, wherein the shell is configured to be positioned between the passenger seat of the vehicle and the child safety seat to stabilize the child safety seat such that the child safety seat can be securely fastened, using one or more straps, to anchors integral to the vehicle, thereby enabling use of the child safety seat to transport a child in a cargo area of the vehicle; and a connector attached to the rear facet of the shell and being configured to removably attach the shell to the rear surface of the passenger seat, wherein the connector is configured to limit movement of the shell relative to the passenger seat during attachment of the child safety seat to the anchors.

9. The child safety seat stabilizing device according to claim 8, wherein the connector comprises a hook element of a hook and loop fastener, wherein the hook element is configured to reversibly attach to a loop element of a hook and loop fastener or to loop carpeting attached to the rear surface of the passenger seat.

10. The child safety seat stabilizing device according to claim 8, wherein the connector comprises a hook element of a hook and loop fastener, wherein the hook element is configured to reversibly attach to a loop element of a hook and loop fastener or to loop carpeting attached to the rear surface of the passenger seat.

11. A child safety seat stabilizing device comprising:

a shell defining an interior space, the shell being rigid, the shell having opposed sides, a base, a rear facet, and a front facet, the opposed sides being substantially triangular, the base, the rear facet, and the front facet being substantially trapezoidal, the base, the rear facet, and the front facet being substantially rectangular, the rear facet and the base forming a first angle, the first angle being substantially complementary to a second angle defined by a rear surface of a passenger seat and a cargo bed of a vehicle, the front facet and the base forming a third angle, the third angle being substantially complementary to a fourth angle defined by a bottom face and a rear face of a child safety seat, wherein the shell is configured to be positioned between the passenger seat of the vehicle and the child safety seat to stabilize the child safety seat such that the child safety seat can be securely fastened, using one or more straps, to anchors integral to the vehicle, thereby enabling use of the child safety seat to transport a child in a cargo area of the vehicle;

the opposed sides extending past the base defining a pair of bottom rails and a bottom recess, the bottom recess facilitating access to the one or more straps used in fastening the child safety seat to the anchors;

the shell having a void extending into said rear facet and said base, the void defining a vertical section and an angular section of the rear facet, such that a space exists between the vertical section and the rear surface of the passenger seat of the vehicle upon positioning of the angular section against the rear surface of the passenger seat, the space facilitating access to the one or more straps used in fastening the child safety seat to the anchors; and a connector attached to the rear facet of the shell and being configured to removably attach the shell to the rear surface of the passenger seat, wherein the connector is configured to limit movement of the shell relative to the passenger seat during attachment of the child safety seat to the anchors, the connector comprising a hook element of a hook and loop fastener, wherein the hook element is configured to reversibly attach to a loop element of a hook and loop fastener or to loop carpeting attached to the rear surface of the passenger seat.

12. A method of mounting a child safety seat in a cargo area of a vehicle, the method comprising the steps of:

providing a seat stabilizing device including:

a shell defining an interior space, the shell being rigid, the shell having opposed sides, a base, a rear facet, and a front facet, the opposed sides being substantially triangular, the base, the rear facet, and the front facet being substantially trapezoidal, the rear facet and the base forming a first angle, the first angle being substantially complementary to a second angle defined by a rear surface of a passenger seat and a cargo bed of a vehicle, the front facet and the base forming a third angle, the third angle being substantially complementary to a fourth angle defined by a bottom face and a rear face of a child safety seat;

a ratcheting strap comprising a first section fitted with a first hook and a second section fitted with a second hook and a ratchet;

positioning the shell between the passenger seat of the vehicle and the child safety seat to stabilize the child safety;

attaching the first hook to one of the anchors and the second hook to another of the anchors;

positioning the rear facet of the shell against the rear surface of the passenger seat;

positioning the rear face of the child safety seat against the front facet of the shell;

passing the first section of the ratcheting strap through a channel in the child safety seat;

feeding the first section of the ratcheting strap into the ratchet; and manipulating the ratchet to tighten the ratcheting strap so that the child safety seat and the shell are fixedly positioned relative to the passenger seat.

13. The method of mounting a child safety seat in a cargo area of a vehicle according to claim 12, further including the step of removably attaching the shell to the rear surface of the passenger seat with a connector, the connector comprising a hook element of a hook and loop fastener attached to the shell, wherein the hook element is configured to reversibly attach to loop carpeting attached to the rear surface of the passenger seat.

* * * * *